United States Patent [19]

Wolfs et al.

[11] 4,219,338

[45] Aug. 26, 1980

[54] HYDROTHERMAL ALKALI METAL RECOVERY PROCESS

[75] Inventors: Denise Y. Wolfs, Houston; Le Roy R. Clavenna, Baytown; James M. Eakman, Houston, all of Tex.; Theodore Kalina, Morris Plains, N.J.

[73] Assignee: Exxon Research & Engineering Co., Florham Park, N.J.

[21] Appl. No.: 906,516

[22] Filed: May 17, 1978

[51] Int. Cl.$^2$ ............................. C10J 3/06; C10J 3/54
[52] U.S. Cl. ................................. 48/197 R; 48/202; 48/210; 208/9; 252/412
[58] Field of Search .................... 48/197 R, 202, 210; 423/119, 127, 111, 203, 206 R, 208; 208/10, 9; 252/412, 420, 373, 411; 201/38

[56] References Cited

U.S. PATENT DOCUMENTS

| 3,033,647 | 5/1962 | Yamazaki | 423/203 |
| 3,998,607 | 12/1976 | Wesselhoft et al. | 48/197 R |
| 4,057,512 | 11/1977 | Vedori et al. | 48/210 |
| 4,159,195 | 6/1979 | Clavenna | 48/197 R |

FOREIGN PATENT DOCUMENTS 108917 11/1957 U.S.S.R.

OTHER PUBLICATIONS

"Rate of Decomposition of Nephelire by the Hydrochemical Method" Sazlin et al., Zhurnal Prikladnoi Khimii, vol. 39, No. 12 pp. 2617–2622, 1966.
"A Study of the Effects of Potassium on the Process of Decomposition of Aluminosilicates by the ... Method", Buklovets et al., Fiz Khim OSN pp. 101–116, 1969.

Primary Examiner—Peter F. Kratz
Attorney, Agent, or Firm—Yale S. Finkle

[57] ABSTRACT

In a coal gasification operation or similar conversion process carried out in the presence of an alkali metal-containing catalyst wherein solid particles containing alkali metal residues are produced, alkali metal constituents are recovered from the particles by treating them with a calcium or magnesium-containing compound in the presence of water at a temperature between about 250° F. and about 700° F. and in the presence of an added base to establish a pH during the treatment step that is higher than would otherwise be possible without the addition of the base. During the treating process the relatively high pH facilitates the conversion of water-insoluble alkali metal compounds in the alkali metal residues into water-soluble alkali metal constituents. The resultant aqueous solution containing water-soluble alkali metal constituents is then separated from the residue solids, which consist of the treated particles and any insoluble materials formed during the treatment step, and recycled to the gasification process where the alkali metal constituents serve as at least a portion of the alkali metal constituents which comprise the alkali metal-containing catalyst. Preferably, the base that is added during the treatment step is an alkali metal hydroxide obtained by water washing the residue solids produced during the treatment step.

18 Claims, 1 Drawing Figure

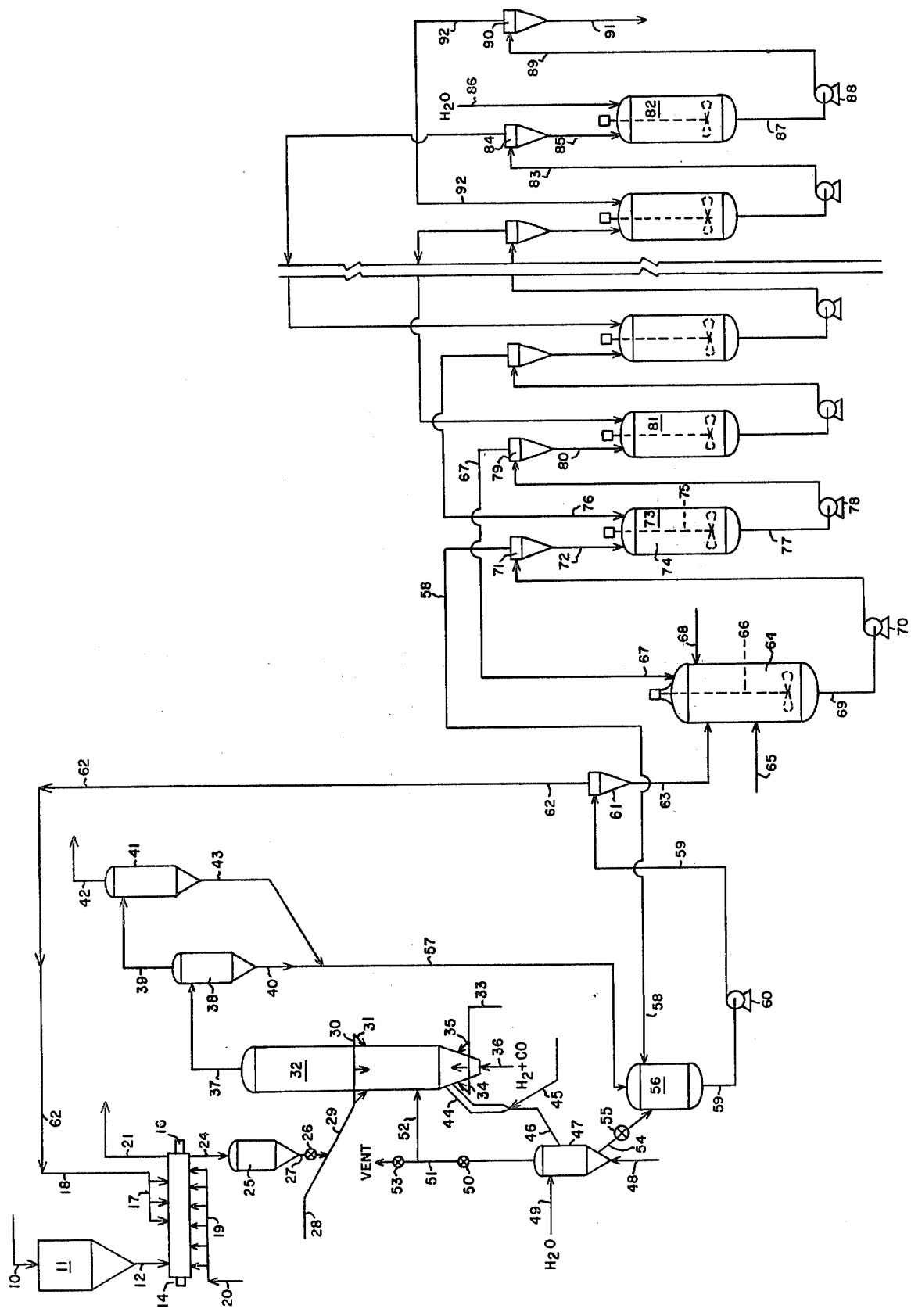

HYDROTHERMAL ALKALI METAL RECOVERY PROCESS

The government of the United States of America has rights in this invention pursuant to Contract No. E(49-18)-2369 awarded by the U.S. Energy Research and Development Administration.

BACKGROUND OF THE INVENTION

1. Field of the Invention

This invention relates to the conversion of coal and similar carbonaceous solids in the presence of alkali metal-containing catalysts and is particularly concerned with the recovery of alkali metal constituents from spent solids produced during coal gasification and similar operations and their reuse as constituents of the alkali metal-containing catalysts.

2. Description of the Prior Art

Potassium carbonate, cesium carbonate and other alkali metal compounds have been recognized as useful catalysts for the gasification of coal and similar carbonaceous solids. The use of such compounds in coal liquefaction, coal carbonization, coal combustion and related processes has been proposed. To secure the higher reaction rates made possible by the presence of the alkali metal compounds it has been suggested that bituminous coal, subbituminous coal, lignite, petroleum coke, oil shale, organic wastes and similar carbonaceous materials be mixed or impregnated with potassium, cesium, sodium or lithium compounds, alone or in combination with other metallic constituents, before such materials are reacted with steam, hydrogen, oxygen or other agents at elevated temperatures to produce gaseous and/or liquid effluents. Studies have shown that a wide variety of different alkali metal compositions can be used for this purpose, including both organic and inorganic salts, oxides, hydroxides and the like. In general the above-described studies indicate that cesium compounds are the most effective gasification catalysts followed by potassium, sodium and lithium compounds in that order. Because of the relatively high cost of cesium compounds and the low effectiveness of lithium compounds, most of the experimental work performed in this area in the past has been directed toward the use of compounds of potassium and sodium. This work has shown that the potassium compounds are substantially more effective than the corresponding sodium compounds. Attention has therefore been focused on the use of potassium carbonate.

Coal gasification processes and similar operations carried out in the presence of alkali metal compounds at high temperatures generally result in the formation of chars and alkali metal residues. The chars normally include unconverted carbonaceous constituents of the coal or other feed material and various inorganic constituents generally referred to as ash. It is generally advisable to withdraw a portion of the char from the reaction zone during gasification and similar operations in order to eliminate the ash and prevent it from building up within the reaction zone or other vessels in the system. Elutriation methods and other techniques for separating char particles of relatively high ash content and returning particles of relatively low ash content to the reaction zone in order to improve the utilization of carbon in such process has been suggested. In gasification and other processes referred to above that utilize alkali metal-containing catalysts, the cost of the alkali metal constituents is a significant factor in determining the overall cost of the process. In order to maintain catalyst cost at reasonable levels, it is essential that the alkali metal constituents be recovered and reused. There have been proposals for the recovery of alkali metal constituents by leaching as they are withdrawn from the reaction zone with char during operations of the type referred to above. Studies indicate that these constituents are generally present in part as carbonates and other water-soluble compounds which can be recovered by water washing. Experience has shown that only a portion of the potassium carbonate or other alkali metal constituents is normally recovered and that substantial quantities of makeup alkali metal compounds are therefore required. This adds appreciably to the cost of such operations.

It has recently been found that increased amounts of alkali metal constituents can be effectively recovered in the form of alkali metal carbonates from the char particles by treating them with calcium hydroxide in the presence of water at elevated temperatures and pressures and thereafter contacting the resultant aqueous solution with carbon dioxide to precipitate any aluminum in solution and to form alkali metal carbonates. The calcium ions from the calcium hydroxide evidently react with alkali metal aluminosilicates and other insoluble alkali metal compounds in the char particles thereby liberating alkali metal constituents which dissolve in the water to form an aqueous solution. The resultant solution is then carbonated and recycled to the reaction zone where the resulting alkali metal carbonates are reused as at least a portion of the alkali metal-containing catalyst. Although this process permits additional recovery of alkali metal constituents in the form of carbonates, a certain amount of expensive, catalytically active makeup alkali metal compounds such as carbonates or hydroxides is still required along with a carbon dioxide stripping step.

SUMMARY OF THE INVENTION

The present invention provides an improved process for the recovery of alkali metal constituents from mixtures of char and ash produced during coal gasification and other conversion processes carried out in the presence of an alkali metal-containing catalyst. In accordance with the invention, it has now been found that a substantial increase in the amount of alkali metal constituents that can be effectively recovered from particles containing alkali metal residues produced during coal gasification and related high temperature conversion processes by treating the particles with a calcium or magnesium-containing compound in the presence of water at temperatures ranging from about 250° F. to about 700° F. is obtained by carrying out the treatment step in the presence of an added base or mixture of bases to maintain a pH during the treatment step that is higher than would otherwise be obtained without the addition of the base. During the treating process the calcium or magnesium-containing compound reacts with the water-insoluble alkali metal compounds comprising the alkali metal residues and converts them into water-soluble alkali metal constituents. The increased pH facilitates the conversion of the water-insoluble alkali metal constituents and thereby results in a greater production of water-soluble alkali metal constituents than could otherwise be obtained. The alkali metal constituents present in the aqueous solution produced during the treatment step are then used in the conversion process as at least a portion of the alkali metal constituents which comprise the alkali metal-containing catalyst. Preferably, such use is achieved by recycling the aqueous solution directly to the conversion process. If desired, however, the alkali metal constituents may first be recovered from the solution and then used in the conversion process.

In general, sufficient base is added during the treatment step to maintain the pH in the treatment zone at a value above about 10.5, preferably at about 13.0 or above. The increased pH is normally obtained by adding a base such as an alkali metal hydroxide, which serves as a makeup compound that is required to replace those alkali metal constituents in the treated particles that are not recovered for reuse in the process, directly to the treatment zone along with a recycle solution obtained by water leaching or washing the residue solids produced in the treatment step.

The process of the invention, unlike similar processes proposed in the past, enhances the conversion of the water-insoluble alkali metal constituents present in the alkali metal residues withdrawn with the ash and char from the conversion process thereby decreasing the amount of makeup alkali metal compounds that is required. As a result the invention makes possible substantial savings in gasification and other conversion operations carried out in the presence of alkali metal-containing catalysts and permits the generation of product gases and/or liquids at significantly lower cost than would otherwise be the case.

BRIEF DESCRIPTION OF THE DRAWING

The drawing is a schematic flow diagram of a catalytic coal gasification process in which alkali metal constituents of the catalyst are recovered and reused in the process.

DESCRIPTION OF THE PREFERRED EMBODIMENTS

The process depicted in the drawing is one for the production of methane by the gasification of a bituminous coal, subbituminous coal, lignite or similar carbonaceous solids with steam at high temperature in the presence of a carbon-alkali metal catalyst prepared by impregnating the feed solids with a solution of an alkali metal compound or a mixture of such compounds and thereafter heating the impregnated material to a temperature sufficient to produce an interaction between the alkali metal and the carbon present. It will be understood that the alkali metal recovery system disclosed is not restricted to this particular gasification process and that it can be employed in conjunction with any of a variety of other conversion processes in which alkali metal compounds or carbon-alkali metal catalysts are used to promote the reaction of steam, hydrogen, oxygen or the like with carbonaceous feed materials to produce a char, coke or similar solid product containing alkali metal residues from which alkali metal compounds are recovered for reuse as the catalyst or a constituent of the catalyst. It can be employed, for example, for the recovery of alkali metal compounds from various processes for the gasification of coal, petroleum coke, lignite, organic waste materials and similar solids feed streams which produce spent carbonaceous solids. Other conversion processes with which it may be used include operations for the carbonization of coal and similar feed solids, for the liquefaction of coal and related carbonaceous materials, for the retorting of oil shale, for the partial combustion of carbonaceous feed materials, and the like. Such processes have been disclosed in the literature and will be familiar to those skilled in the art.

In the process depicted in the drawing, a solid carbonaceous feed material such as bituminous coal, subbituminous coal, lignite or the like that has been crushed to a particle size of about 8 mesh or smaller on the U.S. Sieve Series Scale is passed into line 10 from a feed preparation plant or storage facility that is not shown in the drawing. The solids introduced into line 10 are fed into a hopper or similar vessel 11 from which they are passed through line 12 into feed preparation zone 14. This zone contains a screw conveyor or similar device, not shown in the drawing, that is powered by a motor 16, a series of spray nozzles or similar devices 17 for the spraying of alkali metal-containing solution supplied through line 18 onto the solids as they are moved through the preparation zone by the conveyor, and a similar set of nozzles or the like 19 for the introduction of steam into the preparation zone. The steam, supplied through line 20, serves to heat the impregnated solids and drive off the moisture. Steam is withdrawn from zone 14 through line 21 and passed to a condenser, not shown, from which it may be recovered for use as makeup water or the like. The alkali metal-containing solution is recycled through line 62 from the alkali metal recovery section of the process, which is described in detail hereafter.

It is preferred that sufficient alkali metal-containing solution be introduced into feed preparation zone 14 to provide from about 1 to about 50 weight percent of the alkali metal compound or mixture of such compounds on the coal or other carbonaceous solids. From about 1 to about 15 weight percent is generally adequate. The dried impregnated solid particles prepared in zone 14 are withdrawn through line 24 and passed to a closed hopper or similar vessel 25. From here they are discharged through a starwheel feeder or equivalent device 26 in line 27 at an elevated pressure sufficient to permit their entrainment into a stream of high pressure steam, recycle product gas, inert gas or other carrier gas introduced into line 29 via line 28. The carrier gas and entrained solids are passed through line 29 into manifold 30 and fed from the manifold through feedlines 31 and nozzles, not shown in the drawing, into gasifier 32. In lieu of or in addition to hooper 25 and starwheel feeder 26, the feed system may employ parallel lock hoppers, pressurized hoppers, aerated standpipes operated in series, or other apparatus to raise the input feed solids stream to the required pressure level.

It is generally preferred to operate the gasifier 32 at a pressure between about 100 and about 2000 psig. The carrier gas and entrained solids will normally be introduced at a pressure somewhat in excess of the gasifier operating pressure. The carrier gas may be preheated to a temperature in excess of about 300° F. but below the initial softening point of the coal or other feed material employed. Feed particles may be suspended in the carrier gas in a concentration between about 0.2 and about 5.0 pounds of solid feed material per pound of carrier gas. The optimum ratio for a particular system will depend in part upon feed particle size and density, the molecular weight of the gas employed, the temperature of the solid feed material and input gas stream, the amount of alkali metal compound employed and other factors. In general, ratios between about 0.5 and about 4.0 pounds of solid feed material per pound of carrier gas are preferred.

Gasifier 32 comprises a refractory lined vessel containing a fluidized bed of carbonaceous solids extending upward within the vessel above an internal grid or similar distribution device not shown in the drawing. The bed is maintained in the fluidized state by means of steam introduced through line 33, manifold 34 and peripherally spaced injection lines and nozzles 35 and by means of recycle hydrogen and carbon monoxide introduced through bottom inlet line 36. The particular injection system shown in the drawing is not critical and hence other methods for injecting the steam and recycle hydrogen and carbon monoxide may be employed. In some instances, for example, it may be preferred to introduce both the steam and recycle gases through multiple nozzles to obtain more uniform distribution of the injected fluid and reduce the possibility of channeling and related problems. The space velocity of the rising gases within the fluidized bed will normally be between about 300 and 3000 volumes of steam and recycle hydrogen and carbon monoxide per hour per volume of fluidized solids.

The injected steam reacts with carbon in the feed material in the fluidized bed in gasifier 32 at a temperature within the range between about 800° F. and about 1600° F. and at a pressure between about 100 and about 2000 psig. Due to the equilibrium conditions existing in the bed as the result of the presence of the carbon-alkali metal catalyst and the recycle hydrogen and carbon monoxide injected near the lower end of the bed, the reaction products will normally consist essentially of methane and carbon dioxide. Competing reactions which in the absence of the catalyst and the recycle gases would ordinarily tend to produce additional hydrogen and carbon monoxide are suppressed. The ratio of methane to carbon dioxide in the raw product gas thus formed will preferably range from about 1 to about 1.4 moles per mole, depending upon the amount of hydrogen and oxygen in the feed coal or other carbonaceous solids. The coal employed may be considered as an oxygenated hydrocarbon for purposes of describing the reaction. Wyodak coal, for example, may be considered as having the approximate formula $CH_{0.84}O_{0.20}$, based on the ultimate analysis of moisture and ash-free coal and neglecting nitrogen and sulfur. The reaction of this coal with steam to produce methane and carbon dioxide is as follows:

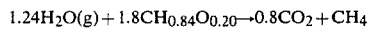

$$1.24H_2O(g) + 1.8CH_{0.84}O_{0.20} \rightarrow 0.8CO_2 + CH_4$$

Under the same gasification conditions, coals of higher oxygen content will normally produce lower methane to carbon dioxide ratios and those of lower oxygen content will yield higher methane to carbon dioxide ratios.

The gas leaving the fluidized bed in gasifier 32 passes through the upper section of the gasifier, which serves as a disengagement zone where particles too heavy to be entrained by the gas leaving the vessel are returned to the bed. If desired, this disengagement zone may include one or more cyclone separators or the like for removing relatively large particles from the gas. The gas withdrawn from the upper part of the gasifier through line 37 will normally contain methane and carbon dioxide produced by reaction of the steam with carbon, hydrogen and carbon monoxide introduced into the gasifier as recycle gas, unreacted steam, hydrogen sulfide, ammonia and other contaminants formed from the sulfur and nitrogen contained in the feed material, and entrained fines. This gas is introduced into cyclone separator or similar device 38 for removal of the larger fines. The overhead gas then passes through line 39 into a second separator 41 where smaller particles are removed. The gas from which the solids have been separated is taken overhead from separator 41 through line 42 and the fines are discharged downward through dip legs 40 and 43. These fines may be returned to the gasifier or passed to the alkali metal recovery section of the process as discussed hereafter.

After entrained solids have been separated from the raw product gases described above, the gas stream may be passed through suitable heat exchange equipment for the recovery of heat and then processed for the removal of acid gases. Once this has been accomplished, the remaining gas, consisting primarily of methane, hydrogen and carbon monoxide, may be cryogenically separated into a product methane stream and a recycle stream of hydrogen and carbon monoxide, which is returned to the gasifier through line 36. Conventional gas processing equipment can be used. Since a detailed description of this downstream gas processing portion of the process is not necessary for an understanding of the invention, it has been omitted.

The fluidized bed in gasifier 32 is comprised of char particles formed as the solid carbonaceous feed material undergoes gasification. The composition of the char particles will depend upon the amount of mineral matter present in the carbonaceous materal fed to the gasifier, the amount of the alkali metal compound or mixture of such compound impregnated into the feed material, and the degree of gasification that the char particles undergo while in the fluidized bed. The lighter char particles, which will have a relatively high content of carbonaceous material, will tend to remain in the upper portion of the fluidized bed. The heavier char particles, which will contain a relatively small amount of carbonaceous material and a relatively large amount of ash and alkali metal residues, will tend to migrate toward the bottom of the fluidized bed. A portion of the heavier char particles are normally withdrawn from the bottom portion of the fluidized bed in order to eliminate ash and thereby prevent it from building up within the gasifier and other vessels in the system.

The process of this invention is based in part upon the fact that alkali metal constituents of the gasification catalyst react with the mineral constituents of the coal and other carbonaceous solids during the gasification process. Studies have indicated that at least a portion of the alkali metal compounds, such as potassium carbonate, sodium carbonate and the like, that are used as gasification catalyst constituents react with the aluminosilicates and other ash constituents to form alkali metal residues containing water-soluble alkali metal compounds such as carbonates, sulfates, sulfides and the like and catalytically inactive materials such as alkali metal aluminosilicates, alkali metal iron sulfides and other water-insoluble compounds.

It has been found that a significant amount of the potassium carbonate or other alkali metal compound employed to impregnate coal or similar feed material prior to gasification will react with the aluminosilicates and other ash constituents during gasification to form alkali metal aluminosilicates, alkali metal iron sulfides and other water-insoluble catalyst residues which cannot normally be recovered from the ash by water washing. Preliminary studies tend to indicate that when potassium carbonate is utilized to impregnate the coal one of the major constituents of the water-insoluble alkali metal residues produced is a synthetic kaliophilite, which has the chemical formula $KAlSiO_4$.

To improve the economics of the catalytic gasification process described above and other catalytic conversion processes where water-insoluble alkali metal residues are formed, it is desirable to recover as much as possible of the alkali metal constituents from the insoluble residues and reuse them as catalyst constituents in the conversion process, thereby decreasing the amount of costly makeup alkali metal compounds needed. It has been found that a substantial amount of the alkali metal constituents in both the water-soluble and water-insoluble alkali metal residues withdrawn with the char and ash from the gasifier of the above-described process or the reaction zone of other conversion processes can be recovered for reuse in the conversion process by treating the particles withdrawn from the reaction zone with a calcium or magnesium-containing compound in the presence of liquid water at a temperature between about 250° F. and about 700° F. and in the presence of an added base. During the treating process the magnesium or calcium-containing compound reacts with water-insoluble alkali metal compounds in the alkali metal residues to produce water-soluble alkali metal constituents which pass into solution and residue solids containing among other components ash, calcium or magnesium silicates, sulfates, and aluminosilicates. The water-soluble alkali metal constituents present in the resulting aqueous solution are then used in the conversion process as at least a portion of the alkali metal constituents which comprise the alkali metal-containing catalyst. Preferably, such use is achieved by recycling the solution to the conversion process. If desired, however, the alkali metal constituents may first be recovered from the solution and then used in the conversion process.

Referring again to the drawing, char particles containing carbonaceous material, ash and alkali metal residues are continuously withdrawn through line 44 from the bottom of the fluidized bed in gasifier 32. The particles flow downward through line 44 countercurrent to a stream of steam or other elutriating gas introduced through line 45. Here, a preliminary separation of solids based on differences in size and density takes place. The lighter particles having a relatively large amount of carbonaceous material tend to be returned to the gasifier and the heavier particles having a relatively high content of ash and alkali metal residues continue downward through line 46 into fluidized bed withdrawal zone 47. Steam or other fluidizing gas is introduced into the bottom of the withdrawal zone through line 48 to maintain the bed in a fluidized state. Water may be introduced through line 49 in order to cool the particles and facilitate their further processing. The withdrawal rate is controlled by regulating the pressure within zone 47 by means of a throttle valve 50 in overhead line 51. The gases from line 51 may be returned to the gasifier through line 52 or vented through valve 53. The solid particles in vessel 47 are now ready for treatment to recover alkali metal constituents from the alkali metal residues in accordance with the invention.

The solid particles in vessel 47 are passed through line 54 containing pressure letdown valve 55 into slurry tank 56. Here the particles are combined with char fines recovered from the raw product gas through dip legs 40 and 43 and line 57 and the resultant mixture is slurried with an aqueous solution containing water-soluble alkali metal constituents injected into the slurry tank through line 58. The production of this aqueous solution enriched in alkali metal constituents is described in detail hereafter. During the slurrying process which takes place in tank 56, a portion of the water-soluble constituents present in the alkali metal residues will dissolve in the solution thereby further enriching it in alkali metal constituents which tend to increase its pH.

The slurry formed in tank 56 is withdrawn through line 59 and passed by means of pump 60 to a hydroclone, centrifuge, filter or similar liquid-solids separation device 61 where the char and fines are removed from the liquid, which is recovered overhead of the separation device and passed through lines 62 and 18 to feed preparation zone 14. Here, the coal or similar carbonaceous feed material is impregnated with the alkali metal constituents in the aqueous solution. If the concentration of alkali metal constituents in the recycle solution is undesirably low, the solution may be concentrated by removing excess water before it is returned to the feed preparation zone. In lieu of recycling the solution in line 62 to the feed preparation zone, alkali metal constituents can be separated from the concentrated solution by evaporation and crystallization, precipitation or other method and added to the feed material in solid form.

The char particles exiting separation device 61 are passed through line 63 into autoclave or similar reaction vessel 64, which is equipped with stirrer 66. Here the alkali metal aluminosilicates and other insoluble alkali metal compounds in the alkali metal residues react, in the presence of water, with a calcium or magnesium-containing compound introduced into the reactor through line 65 to form water-soluble alkali metal constituents and water-insoluble compounds. The primary source of the water that serves as the medium for the conversion of the water-soluble residues into water-soluble alkali metal constituents is an alkaline recycle solution introduced into autoclave 64 through line 67. The production of this alkaline solution, which will normally contain alkali metal hydroxides and other basic water-soluble alkali metal constituents, is described in detail hereafter. Stirrer 66 is continually operated during the reaction to at least partially prevent agglomeration of the reactants and to maintain a well dispersed slurry.

The actual reactions that take place in the autoclave to convert the water-insoluble compounds in the alkali metal residues into water-soluble alkali metal constituents are not completely understood. Apparently, the calcium or magnesium compound at least partially dissolves in the slurry water to yield calcium or magnesium ions that displace or liberate water-soluble alkali metal constituents from the water-insoluble compounds in the alkali metal residues. The liberation of these water-soluble constituents is accompanied by the formation of residue solids composed of various insoluble species. These insoluble species may consist of calcium or magnesium silicates, aluminates, aluminosilicates and other insoluble compounds, depending upon the types of water-insoluble constituents in the alkali metal residues.

It has been found that the conversion of the water-insoluble constituents comprising the alkali metal residues into water-soluble constituents is substantially enhanced if a base or mixture of bases is added to the slurry in the autoclave to increase its pH. In general, sufficient base is added to the autoclave to maintain a pH during the treatment step in the range between about 10.5 and about 15.0, preferably between about 13.0 and about 14.5. It is not presently understood exactly why the increased basicity of the slurry results in greater conversion of the water-insoluble alkali metal residues into water-soluble constituents but it is believed that the higher pH makes the alkali metal aluminosilicates and other insoluble alkali metal residues more susceptible to decomposition by reaction with the calcium or magnesium compound.

The base that is added to the autoclave to increase the pH of the reaction slurry will normally be an alkali metal hydroxide such as sodium hydroxide or potassium hydroxide. Any base, however, can be used if it yields a pH high enough to increase the conversion of water-insouble compounds in the alkali metal residues into water-soluble alkali metal constituents over that which would normally be obtained if no base was added to the autoclave. Preferably, at least a portion of the base that is added is in the form of an alkaline recycle solution produced by water washing the residue solids withdrawn from the autoclave, as is described in detail hereafter. This alkaline solution not only serves as the source of the base but also serves as the primary source of the water that is necessary to form the slurry medium in the autoclave. The alkaline recycle solution will normally contain an alkali metal hydroxide having the same cation as the alkali metal compound originally used to impregnate the feed solids. The recycle solution, however, may also contain other alkali metal constituents. In lieu of or in addition to the recycle solution introduced into the autoclave through line 67, base may be added to the autoclave through line 68. Normally, this base will also serve as the makeup alkali metal compound necessary to compensate for the water-insoluble alkali metal residues that are not converted in the autoclave and are therefore not recovered for reuse in the process.

The actual role of the water in the reactions of the calcium or magnesium-containing compound with the insoluble alkali metal residues is not definitely known. It is theorized, however, that the primary purpose of the water is to provide more favorable reaction kinetics by serving as a medium in which calcium or magnesium ions are very mobile. Sufficient water should be injected into the autoclave through line 67 as part of the aqueous alkaline recycle solution to provide optimum kinetics.

The temperature in autoclave 64 will normally be maintained in the range between about 250° F. and about 700° F., preferably in the range between about 250° F. and about 450° F. and most preferably at a temperature of about 300° F. Since the water in autoclave 64 must always be present in the liquid state to provide the medium for the reactions that take place, the pressure in the autoclave should normally be equal to or greater than the vapor pressure of water at the operating temperature. The residence time in the autoclave will normally be greater than about 30 minutes and will preferably be in the range between about 1.0 hour and 4.0 hours, and will most preferably be about 2.0 hours.

The calcium or magnesium compound used as one of the reactants in the reactions taking place in the autoclave may be any inorganic or organic calcium or magnesium-containing compound that at least partially ionizes or dissociates in water to yield calcium or magnesium ions. The calcium-containing compound may, fo example, be calcium oxide, calcium hydroxide, calcium acetate, calcium oxylate, or the like. Similarly, the magnesium-containing compound may be magnesium oxide, magnesium hydroxide, magnesium acetate, magnesium oxylate, or the like. The actual magnesium or calcium-containing compound used will depend primarily upon its availability, cost and degree of solubility in the reaction medium present in the autoclave. The amount of the calcium or magnesium compound needed will depend in part on the amount of the insoluble alkali metal residues in the particulate matter fed to autoclave 64. If desired, a mixture of two or more calcium or magnesium-containing compounds may be used in lieu of a single compound.

The slurry effluent from reactor 64 is withdrawn through line 69 and passed by means of pump 70 to a hydroclone or other liquid-solids separation device 71 where an aqueous solution containing water-soluble alkali metal constituents is separated from the residue solids, which are comprised of the particulate matter originally fed to autoclave 64 and the water-insoluble precipitates formed by the reactions taking place in the autoclave. The aqueous solution is passed through line 58 to slurry tank 56 where it is slurried with the char particles and fines produced in gasifier 32. As was previously pointed out, the liquid portion of the slurry formed in the tank is recycled to feed preparation zone 14 where the alkali metal constituents present in the liquid, which include substantially all of the water-soluble alkali metal constituents produced from the insoluble alkali metal residues in autoclave 64, are used as at least a portion of the alkali metal constituents comprising the alkali metal-containing catalyst.

The residue solids removed from hydroclone 71 will contain entrained liquid containing alkali metal constituents in addition to water-soluble alkali metal constituents that did not dissolve in the solution removed overhead through line 58. These alkali metal constituents are recovered by passing the residue solids through a multistage countercurrent water extraction unit which includes a plurality of tanks or vats, classifiers, screw fed contactors, thickeners, continuous centrifuges or the like. The number of actual stages employed in the extraction system will depend to a large extent upon the composition of the solids fed to the system and the particular contacting conditions utilized. Each stage in the particular system shown in the drawing includes a closed vat or tank containing a stirrer, means for countercurrent circulation of liquids and solids from one tank to another, and a hydroclone, filter, centrifuge or similar liquid-solids separation device.

The residue solids removed from the slurry fed to hydroclone 71 are passed through line 72 into the final stage 73 of the multistage liquid-solids extraction train. This stage comprises a mixing tank 74 which contains a stirrer 75. In the mixing tank the solids are slurried with an alkali metal-containing solution introduced into the tank through line 76 and the resultant slurry is agitated by the stirrer. Water-soluble alkali metal constituents present in the solid particles are in part extracted by the liquid in contact with the particles.

The slurry which is formed in stage 73 is withdrawn from the bottom of tank 74 through line 77 and circulated by means of pump 78 to hydroclone, centrifuge, filter or similar liquid-solids separation device 79 where the solids are removed from the liquid. These solids, from which a portion of the water-soluble alkali metal constituents have been extracted, are discharged through line 80 into stage 81 of the apparatus. The liquid separated from the solids in hydroclone 79, richer in alkali metal constituents than the liquid in stage 81, is withdrawn from the hydroclone through line 67 and recycled to autoclave 64 where it helps to provide the high pH aqueous medium for the reactions occurring in the autoclave.

Stage 81 and the other intermediate stages of the recovery train are generally similar to stage 73. In each of these stages, solids separated from a relatively concentrated liquid stream in the hydroclone or other liquid-solids separator associated with that stage are discharged into a less concentrated solution and the concentrated solution from the hydroclone or similar device is passed downstream for contact with solids having a higher content of water-soluble alkali metal constituents. Slurry from each stage is pumped to the hydroclone in the adjacent upstream stage for separation into liquid and solid components. In the initial stage 82 of the train, incoming slurry from the second stage flows through line 83 to hydroclone or the like 84, from which the solids are discharged through line 85 into substantially pure water introduced into the stage through line 86.

The slurry formed in initial stage 82 by the mixing of substantially pure water with solids from which most of the water-soluble alkali metal constituents have been extracted results in a slurry of solid particles in a very dilute alkali metal solution. The slurry is withdrawn through line 87 by means of pump 88 and passed through line 89 to a hydroclone or similar device 90. The solids withdrawn from the hydroclone through line 91 will normally contain, among other substances, small amounts of carbonaceous material, ash, and various types of calcium or magnesium silicates. These solids will normally have a low content of alkali metal residues and may be disposed of by landfill, used for construction purposes, or employed in other applications. The very dilute alkali metal solution recovered from hydroclone 90 is passed through line 92 to the second stage of the recovery train.

In the embodiment of the invention shown in the drawing and described above, the slurry exiting slurry tank 56 is passed through hydroclone or similar liquid-solids separation device 61 to remove the alkali metal-containing solution which is then recycled to feed preparation zone 14. It is preferred to recover the solution for recycle at this point in the process in order to minimize the amount of water-soluble alkali metal compounds that enter autoclave 64 where they tend to react with the calcium or magnesium compound. Such reactions will substantially increase the amount of the calcium or magnesium compound needed as compared to the amount that would be required to convert the water-insoluble alkali metal constituents of the alkali metal residues present in the char into water-soluble constituents. The removal of the majority of the liquid portion of the slurry from tank 56 by the hydroclone, however, will tend to decrease the pH in the autoclave since the water-soluble constituents initially present in the char fed to slurry tank 56 will contain basic salts that will dissolve and thereby increase the pH of the slurry in the tank. The removal of the primary portion of the slurry liquid prior to injecting the char particles into the autoclave, may result in the need to add more base to the autoclave through lines 67, 68 or both in order to maintain the pH in the autoclave at a level sufficient to substantially increase the conversion of the insoluble alkali metal residues into water-soluble alkali metal constituents. Thus, in some instances, it may be desirable to remove hydroclone 61 from the process and pass the entire slurry from tank 56 directly into autoclave 64. If this is done, a portion of the aqueous solution removed from hydroclone 71 will be recycled to feed preparation zone 14 to supply alkali metal constituents needed for impregnation into the feed solids and the alkaline recycle solution in line 67 will be diverted from autoclave 64 into slurry tank 56.

The nature and objects of the invention are further illustrated by the results of laboratory tests which indicate that the amount of soluble alkali metal compounds that can be recovered from insoluble alkali metal constituents of a char produced during the catalytic gasification of coal by treating the char with a calcium compound in the presence of liquid water can be substantially increased by carrying out the treatment in the presence of an added base.

To test the effectiveness of the proposed alkali metal recovery method, a tubing bomb having a one-inch outside diameter was charged with about 10 grams of char, along with calcium hydroxide and either distilled water, a 0.25 N solution of sodium hydroxide, or a 15% by weight solution of potassium hydroxide. Sufficient calcium hydroxide was used so that the slurry in the bomb contained a molar ratio of calcium to insoluble potassium of between about 2.3 and about 3.7. Inert steel balls were added to the tubing bomb to insure good agitation and to prevent caking or agglomeration. The tubing bomb was rotated by a variable speed motor inside a tube furnace, which was equipped with a temperature controller. The char was derived from the fluid bed catalytic gasification of an Illinois No. 6 coal that had been impregnated with potassium carbonate. Before the char was fed into the tubing bomb, it was analyzed for total potassium and water-soluble potassium. The amount of water-insoluble potassium present in the char was determined by subtracting these two values. In some of the runs that were carried out, the feed char was washed with water before it was charged to the tubing bomb. Each run was carried out at a temperature of 400° F. and a residence time of four hours. At the end of the reaction the contents of the tubing bomb were rapidly cooled and a solid residue was separated by filtration. The solids from the bomb were washed with a total of about 700 ml. of distilled water. Both the solids and the liquid decantant were analyzed for potassium content. The results of these tests are set forth below in Table I.

TABLE I

| POTASSIUM RECOVERY FROM ILLINOIS CHAR | | | |
|---|---|---|---|
| Run | Mole Ratio Ca/Insoluble K | Reaction Medium | Percent Insoluble Potassium Recovered |
| 1 | 2.3 | Distilled Water | 72 |
| 2 | 2.5 | 15 Wt% KOH | 88 |
| 3* | 3.2 | Distilled Water | 37 |
| 4* | 3.3 | 0.25N NaOH | 61 |
| 5 | 3.7 | Distilled Water | 76 |
| 6 | 3.7 | 0.25N NaOH | 89 |

*Char was water-washed to extract water-soluble potassium constituents before it was charged to the tubing bomb.

It can be seen from Table I that the presence of an added base in the tubing bomb during the treatment with calcium hydroxide results in a substantial increase in the percent of insoluble potassium recovered. The increase in the recovery for Run 5 as compared to Run 3 and for Run 6 as compared to Run 4 can be partially attributed to the fact that more Ca was present in Runs 5 and 6. A portion of the increase, however, is undoubtedly due to the fact that the char was water-washed in Runs 3 and 4 thereby removing some of the soluble salts that would otherwise dissolve in solution to make it even more basic than it would be if the char was not washed with water prior to treatment with calcium hydroxide.

It will be apparent from the foregoing that the process of the invention provides an alkali metal recovery system which makes it possible to significantly increase the amount of alkali metal constituents that are recovered from alkali metal residues produced during catalytic gasification and similar high temperature conversion processes. As a result the need for costly makeup alkali metal compounds is reduced, thereby lowering the overall cost of the conversion process.

We claim:

1. In a process for the conversion of a solid carbonaceous feed material in the presence of an alkali metal-containing catalyst into liquids and/or gases wherein char particles containing carbonaceous material, ash and alkali metal residues are produced, the improvement which comprises:
    (a) treating said char particles containing said carbonaceous material, ash and alkali metal residues with a calcium or magnesium-containing compound in the presence of liquid water and an added base at a temperature between about 250° F. and about 450° F. whereby said calcium or magnesium-containing compound reacts with water-insoluble alkali metal constituents in said alkali metal residues to convert said water-insoluble constituents thereby producing an aqueous solution containing water-soluble alkali metal constituents and residue solids, wherein said base is added in a quantity sufficient to increase the amount of said water-insoluble alkali metal constituents converted into water-soluble alkali metal constituents and wherein at least a portion of said added base is obtained by water washing said residue solids to form an alkaline solution which is recycled to the treatment step; and
    (b) using at least a portion of the water-soluble alkali metal constituents present in said aqueous solution in said conversion process as at least a portion of said alkali metal constituents comprising said alkali metal-containing catalyst.

2. A process as defined in claim 1 wherein said conversion process comprises gasification.

3. A process as defined in claim 1 wherein said conversion process comprises liquefaction.

4. A process as defined in claim 1 wherein at least a portion of said alkali metal-containing catalyst comprises potassium carbonate.

5. A process as defined in claim 1 wherein said char particles containing said carbonaceous material, ash and alkali metal residues are treated with a calcium-containing compound.

6. A process as defined in claim 5 wherein said calcium-containing compound comprises calcium hydroxide.

7. A process as defined in claim 1 wherein said carbonaceous feed material comprises coal.

8. A process as defined in claim 1 wherein said aqueous solution containing said water-soluble alkali metal constituents is recycled to said conversion process where said alkali metal constituents are used as at least a portion of said alkali metal constituents comprising said alkali metal-containing catalyst.

9. A process as defined in claim 1 wherein at least a portion of said added base is obtained by water washing said char particles containing said carbonaceous material, ash and alkali metal residues prior to treating said char particles with said calcium or magnesium-containing compound.

10. A process as defined in claim 1 wherein said base comprises an alkali metal hydroxide.

11. A process as defined in claim 4 wherein said base comprises potassium hydroxide.

12. In a process for the conversion of a solid carbonaceous feed material in the presence of an alkali metal-containing catalyst into liquids and/or gases wherein particles containing alkali metal residues are produced, the improvement which comprises:
    (a) treating said particles containing said alkali metal residues with a calcium or magnesium-containing compound in the presence of liquid water and a recycle alkaline solution containing an alkali metal hydroxide at a temperature between about 250° F. and about 450° F. whereby said calcium or magnesium-containing compound reacts with water-insoluble alkali metal constituents in said alkali metal residues to convert said water-insoluble constituents into water-soluble alkali metal constituents thereby producing an aqueous solution containing water-soluble alkali metal constituents and residue solids, wherein said recycle alkaline solution contains a sufficient amount of said alkali metal hydroxide to maintain a pH during said treatment step of about 13.0 or above;
    (b) recycling said aqueous solution containing said water-soluble alkali metal constituents produced in said treatment step to said conversion process where said alkali metal constituents are used as at least a portion of said alkali metal constituents comprising said alkali metal-containing catalyst;
    (c) leaching said residue solids produced in said treatment step with water to form said recycle alkaline solution containing said alkali metal hydroxide; and
    (d) recycling said alkaline solution containing said alkali metal hydroxide to said treatment step thereby increasing the amount of water-insoluble alkali metal constituents converted into water-soluble alkali metal constituents during said treatment step.

13. A process as defined in claim 12 wherein said particles are treated with calcium hydroxide.

14. A process as defined in claim 12 wherein said particles are treated with calcium oxide.

15. In a process for the production of a methane-containing gas wherein coal is gasified in the presence of a carbon-alkali metal catalyst and particles containing alkali metal residues are produced, the improvement which comprises:

(a) treating said particles containing said alkali metal residues with a calcium-containing compound in the presence of liquid water and a recycle alkaline solution containing an alkali metal hydroxide at a temperature between about 250° F. and about 450° F. whereby said calcium-containing compound reacts with water-insoluble alkali metal constituents in said alkali metal residues to convert said water-insoluble constituents into water-soluble alkali metal constituents thereby producing an aqueous solution containing water-soluble alkali metal constituents and residue solids, wherein said recycle alkaline solution contains a sufficient amount of said alkali metal hydroxide to maintain a pH during said treatment step of about 13.0 or above;

(b) recycling said aqueous solution containing said water-soluble alkali metal constituents produced in said treatment step to said gasification process where said alkali metal constituents are used as at least a portion of said alkali metal constituents comprising said carbon-alkali metal catalyst;

(c) introducing said residue solids into the final stage of a countercurrent, multistage water leaching system having an initial stage and a final stage;

(d) introducing water into said initial stage of said leaching system;

(e) passing said residue solids and said water countercurrently through said leaching system;

(f) withdrawing residue solids substantially depleted of water-soluble alkali metal constituents including alkali metal hydroxide from said initial stage of said system;

(g) withdrawing said alkaline solution containing said alkali metal hydroxide from said final stage of said system; and (h) recycling said alkaline solution to said treatment step thereby increasing the amount of water-insoluble alkali metal constituents converted into water-soluble alkali metal constituents during said treatment step.

16. A process as defined in claim 15 wherein said carbon-alkali metal catalyst comprises a carbon-potassium reaction product.

17. A process as defined in claim 15 wherein said calcium-containing compound comprises calcium hydroxide.

18. A process as defined in claim 15 wherein said calcium-containing compound comprises calcium oxide.

* * * * *